United States Patent
Xiao et al.

(10) Patent No.: US 9,415,348 B2
(45) Date of Patent: Aug. 16, 2016

(54) METHOD FOR PREPARING AROMATIC POLYAMIDE POROUS HOLLOW FIBER MEMBRANE

(71) Applicant: TIANJIN POLYTECHNIC UNIVERSITY, Tianjin (CN)

(72) Inventors: Changfa Xiao, Tianjin (CN); Chun Wang, Tianjin (CN); Mingxing Chen, Tianjin (CN); Shulin An, Tianjin (CN); Qinglin Huang, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 0 days.

(21) Appl. No.: 14/857,879

(22) Filed: Sep. 18, 2015

(65) Prior Publication Data

US 2016/0001234 A1   Jan. 7, 2016

(30) Foreign Application Priority Data

Nov. 7, 2014   (CN) .......................... 2014 1 0624318

(51) Int. Cl.
| | | |
|---|---|---|
| *B01D 33/21* | (2006.01) |
| *B01D 39/00* | (2006.01) |
| *B01D 39/14* | (2006.01) |
| *B29C 47/00* | (2006.01) |
| *B29C 47/88* | (2006.01) |
| *B29C 47/80* | (2006.01) |
| *B01D 69/08* | (2006.01) |
| *B01D 71/56* | (2006.01) |
| *B29C 47/10* | (2006.01) |
| *B01D 69/14* | (2006.01) |
| *B29K 105/16* | (2006.01) |
| *B29L 31/00* | (2006.01) |
| *B29K 77/00* | (2006.01) |
| *B29K 471/00* | (2006.01) |
| *B29K 509/00* | (2006.01) |

(52) U.S. Cl.
CPC ............ *B01D 69/087* (2013.01); *B01D 69/148* (2013.01); *B01D 71/56* (2013.01); *B29C 47/0004* (2013.01); *B29C 47/0023* (2013.01); *B29C 47/0088* (2013.01); *B29C 47/1063* (2013.01); *B29K 2077/10* (2013.01); *B29K 2105/16* (2013.01); *B29K 2471/00* (2013.01); *B29K 2509/00* (2013.01); *B29L 2031/755* (2013.01)

(58) Field of Classification Search
CPC ........ B01D 71/56; B01D 69/02; B01D 69/08; B01D 69/087; B01D 69/148; B01D 71/64
USPC ........................................ 210/500.23, 500.38
See application file for complete search history.

(56) References Cited

U.S. PATENT DOCUMENTS 5,472,607 A * 12/1995 Mailvaganam ........ B01D 69/08
                                                                 210/490

(Continued)

*Primary Examiner* — Ana Fortuna

(57) ABSTRACT

A method for preparing an aromatic polyamide porous hollow fiber membrane firstly premixes PPTA resin, solvent, composite pore-forming agents and inorganic particles in a stirring vessel to form casting solution, secondly injects the casting solution into a double-screw extruder to be fully dissolved under the effect of shear force and enters a spinneret via a metering pump. The PPTA hollow fiber membranes are prepared by the dry-wet spinning method, which solves the problems that hard pore-forming and low porosity in the preparation process of PPTA porous membrane. Utilization of the double-screw extruder is capable of greatly shortening the dissolved time and the deaeration time. Meanwhile the increase of PPTA in casting solution also improves mechanical properties of the PPTA membrane. The addition of the inorganic particles improves mechanical toughness and enhance pure water flux, hydrophilia and rejection rate.

2 Claims, 1 Drawing Sheet

(56) References Cited

U.S. PATENT DOCUMENTS

| | | | |
|---|---|---|---|
| 2010/0036007 A1* | 2/2010 | Journee | C08J 9/236 521/60 |
| 2010/0305217 A1* | 12/2010 | Qiu | B01D 67/0088 514/772.3 |
| 2013/0341273 A1* | 12/2013 | Weber | B01D 71/68 210/644 |
| 2014/0001234 A1* | 1/2014 | Shelton, IV | A61B 17/07207 227/176.1 |
| 2016/0001233 A1* | 1/2016 | Xiao | B01D 63/027 210/500.23 |

* cited by examiner

METHOD FOR PREPARING AROMATIC POLYAMIDE POROUS HOLLOW FIBER MEMBRANE

CROSS REFERENCE OF RELATED APPLICATION

The present application claims priority under 35 U.S.C. 119(a-d) to CN 201410624318.7, filed Nov. 7, 2014.

BACKGROUND OF THE PRESENT INVENTION

1. Field of Invention

The present invention relates to an organic-inorganic hybrid hollow fiber membrane technique, and more particularly to a method for preparing an aromatic polyamide porous hollow fiber membrane. The aromatic polyamide is poly-p-phenylene terephthalamide (PPTA).

2. Description of Related Arts

In general, a phase-to-phase interface layer exists between different polymers. Due to existence of the phase-to-phase interface, the polymers are easy to have separation phenomena during the process of manufacture or utilizing. Thus, the phase separation phenomena can be utilized during the process of membrane manufacture, so as to optimize the performance of the membrane.

When the organic polymers are hybridized and mixed with the inorganic particles, the inorganic particles are usually high surface energy substance, but the organic polymers are usually low surface energy substance. Thus, the mixture of the organic polymers and the inorganic particles will inevitably form new phase interfaces, so as to form micropores taking advantage of phase separation. The conventional porous membranes have advantages of good flexibility, high permeability and simple preparation process, but the solvent resistance, corrosion resistance and temperature resistance thereof are poor. At the same time, in spite of the high strength, high corrosion resistance and high temperature resistance, the inorganic membrane is fragile and difficult to manufacture and has high cost. Thus, the organic-inorganic hybrid membrane has both the characteristics of organic components and inorganic components and thus has good separation properties and physical and chemical stability.

Poly-p-phenylene terephthalamide (PPTA) is a typical para-aromatic polyamide which is a rigid macromolecule and an important raw material for manufacturing Kevlar® fiber. Having excellent high temperature resistance and solvent resistance, the PPTA is a satisfying material for manufacturing high-performance porous hollow fiber membrane. However, since the melting point (over 500° C.) of the PPTA is below the decomposition temperature, the PPTA can not be fabricated by melt spinning technique. In addition, since the PPTA rigid macromolecule has a smaller entropy of free energy change than the flexible macromolecule during the dissolution process and thus is difficult to be dissolved in the conventional solvent and only capable of being dissolved in strong acid such as sulfuric acid and chlorosulfonic acid. P. Zschocke et al. produce a PPTA flat membrane and test the flux of the PPTA flat membrane in different types of solvents. Pure water flux of the PPTA flat membrane is only 12.8 L/($m^2$ d) (3 MPa). [Shown as *Solvent resistant membranes from poly*-(p-*phenylene-terephthalamide*), *Desalination,* 34 (1980):69-751 Katsumori Nakura et al. test the PEG (50000) rejection performance of PPAT flat membrane in different kinds of solvents. Though the rejection rate is high, there is also the problem of low flux.

During the preparation process of the PPTA spinning solution, stir and deaeration of high viscosity casting solution are two difficult problems to be solved. The dissolved method of PPTA in concentrated sulfuric acid is known to all. However, dissolving high viscosity casting solution in the conventional stirring vessel requires 2-3 hours, and the deaeration time thereof is even longer, which leads to the degradation of PPTA macromolecule, so that the mechanical properties of the hollow fiber membrane are influenced, and that the composite pore-forming agents are modified to cause blackening and deterioration of the casting solution.

SUMMARY OF THE PRESENT INVENTION

In view of the disadvantages of the conventional arts, the technical problem to be solved by the present invention is to provide a method for preparing an aromatic polyamide porous hollow fiber membrane. In the method, firstly premix PPTA resin, solvent, composite pore-forming agents and inorganic particles in a stirring vessel to form casting solution, secondly inject the casting solution into a double-screw extruder to be fully dissolved under the effect of shear force, finally squeeze the casting solution into a spinneret via a metering pump. The PPTA hollow fiber membranes are prepared by the dry-wet spinning method, which solves the problems that difficult pore-forming and low porosity during the preparation process of PPTA hollow fiber membrane.

A technical solution to be solved by the present invention is to provide a method for preparing an aromatic polyamide porous hollow fiber membrane, comprising adopting a casting solution and a filming technology;

wherein components of the casting solution and mass fractions thereof are:

PPTA resin 1%-20%;

pore-forming agents 5%-20%;

solvent 60%-94%; wherein a sum of the mass fractions of the PPTA, pore-forming agents and solvent is 100%;

inorganic particles 0.05-50% of the weight of PPTA resin;

wherein logarithmic specific concentration viscosity of the PPTA resin is at a rang of 4.5 dL/g-9.5 dL/g;

the pore-forming agents is a water-soluble macromolecule and is selected from the group consisting of PEG with an average molecular weight of 1000-20000 and PVP with an average molecular weight of 10000-1000000;

the solvent is sulfuric acid having a mass concentration at a range of 98%-106%;

the inorganic particles are at least one member selected from the group consisting of silicon dioxide, calcium oxide and calcium carbonate;

wherein the method for preparing the aromatic polyamide porous hollow fiber membrane comprises steps of:

(1) pre-treating under 55° C. ultrasonic treatment, adding the PPTA resin in phosphoric acid solution having a mass concentration of 0.5-1% for 15-60 minutes, then drying the PPTA resin and the inorganic particles in vacuum under 100° C.-200° C. for more than 24 hours; and (2) preparing PPTA porous hollow fiber membrane mixing the PPTA resin, the inorganic particles and the solvent which are pretreated in a sealed stirring vessel, stirring for 1-2 hours under 40-50° C. to obtain transparent yellow thick liquid, then adding the composite pore-forming agents to form casting solution, then injecting the casting solution into a double-screw extruder to be dissolved at 80-90° C. for 1-20 minutes, besides injecting sulfuric acid aqueous solution with a temperature at a range of 0-90° C., a flow velocity at a range of 10-100 ml/min and a volume fraction of 0-50% for serving as spinning bore liquid, while squeeze the casting solution into a hollow spinneret by a metering pump, wherein an extension ratio of a spinning jet is at a range of 1-10 times, finally extrude the casting solution by the hollow spinneret. Thus an air bath is passed through a height range of 10-100 mm, and immersed in sulfuric acid aqueous solution having a volume fraction at a range of 0-50% for serving as coagulation bath to obtain a primary PPTA porous hollow fiber membrane, then winding, water scrubbing and neutralizing with alkaline liquor, extraction eluting in at a room temperature water bath for over 48 hours to obtain the PPTA porous hollow fiber membrane.

Compared with the conventional art, beneficial effects of the present invention are as follows. The present invention takes advantages of the high shearing stress of the extruder to greatly shorten the dissolved time and the deaeration time, further increase content of PPTA in feed liquid, and improve mechanical properties of the PPTA hollow fiber membrane. The addition of the inorganic particles improves performance and mechanical toughness of the membrane, which enhances pure water flux, hydrophilia and rejection rate.

The composite pore-forming agents PEG/PVP in the present invention is the key to solve the problem that PPTA is not easily pore-forming. The PPTA porous hollow fiber membrane prepared in the present invention has a small average pore size and a high porosity, this is because when the alcohol ketones are mixed with inorganic salt, the existence of hydroxyl in alcohol ketones make the inorganic ions to have more groups, weaken charge interaction among ions, and thus has a homogenizing effect. Furthermore, the addition of inorganic particle makes the surface of the PPTA become rough and increases the effective filtration area of the membrane. Since the PPTA and the inorganic particle are not capable of dissolving in each other, the forming process of fiber membrane easily generates interface microvoid, in such a manner that the permeability and the mechanical properties of the membrane are significantly improved.

DETAILED DESCRIPTION OF THE PREFERRED EMBODIMENT

Figure 1:
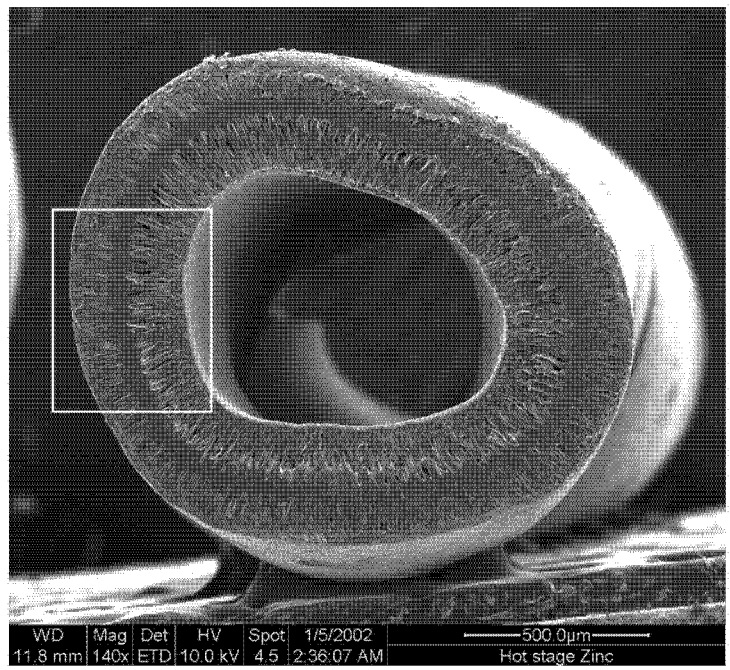
FIG. 1 is an election microscope of a cross section view of a morphology of an aromatic polyamide hollow fiber membrane prepared according to the method of the present invention.

Detailed description of the present invention is illustrated as follows. The preferred examples of the present invention are exemplary only and not intended to be limited.

A technical solution to be solved by the present invention is to provide a method for preparing an aromatic polyamide porous hollow fiber membrane, comprising adopting a casting solution and a filming technology;
wherein components of the casting solution and mass fractions thereof are:
PPTA resin 1%-20%;
pore-forming agents 5%-20%;
solvent 60%-94%; wherein a sum of the mass fractions of the PPTA, pore-forming agents and solvent is 100%;
inorganic particles 0.05-50% of the weight of PPTA resin;
wherein logarithmic specific concentration viscosity of the PPTA resin is at a rang of 4.5 dL/g-9.5 dL/g;

the pore-forming agents are water-soluble macromolecule and is selected from the group consisting of PEG with an average molecular weight of 1000-20000 and PVP with an average molecular weight of 10000-1000000;
the solvent is sulfuric acid having a mass concentration at a range of 98%-106%;
the inorganic particles are at least one member selected from the group consisting of silicon dioxide, calcium oxide and calcium carbonate with an average particle size of 5 nm-10 μm;
wherein the method for preparing the aromatic polyamide porous hollow fiber membrane comprises steps of:
(1) pre-treating
wherein under ultrasonic processing at 55° C., the PPTA resin is treated for 15-60 minutes in phosphoric acid solution which is a mass concentration of 0.5-1%, then the PPTA resin and the inorganic particles are dried in vacuum at 100° C.-200° C. for more than 24 hours;); and
(2) preparing PPTA porous hollow fiber membrane
wherein the wholly pretreated PPTA resin and the inorganic particles are mixed into the solvent in a sealed stirring vessel, stirring for 1-2 hours at 40° C.-50° C. to obtain transparent yellow thick liquid, and the composite pore-forming agents are added to form casting solution,) then injecting the casting solution into a double-screw extruder to be dissolved at 80-90° C. for 1-20 minutes, besides inject sulfuric acid aqueous solution with a temperature at a range of 0-90° C., a flow velocity at a range of 10-100 ml/min and a volume fraction of 0-50% for serving as spinning bore liquid, while squeeze the casting solution into a hollow spinneret by a metering pump, wherein an extension ratio of a spinning jet is at a range of 1-10 times, finally extrude the casting solution by the hollow spinneret. Thus an air bath is passed through a height range of 10-100 mm, and immersed in sulfuric acid aqueous solution having a volume fraction at a range of 0-50% for serving as coagulation bath to obtain a primary PPTA porous hollow fiber membrane, then winding, water scrubbing and neutralizing with alkaline liquor, the PPTA porous hollow fiber membranes are obtained in water bath for over 48 hours at a room temperature.

The extension ratio of the spinning jet refers to a ratio of winded velocity to extruded velocity.

Example 1 under ultrasonic processing at 55° C., the PPTA resin is treated for 15-60 minutes in phosphoric acid solution which is a mass concentration of 0.5-1%, then the PPTA resin and the inorganic particles are dried in vacuum at 100° C.-200° C. for more than 24 hours;

The wholly pretreated 2.0 wt % PPTA resin and 0.5 wt % nano silicon dioxide are mixed into 88 wt % sulfuric acid which is a mass concentration of 98% in a sealed stirring vessel, stirring for 2 hours at 40° C. to obtain transparent yellow thick premixed liquid, and then the 10 wt % composite pore-forming agents PEG (2000) and PVP (58000) are added to form casting solution, wherein a mass ratio of PEG (2000): PVP (58000)=9:1, then inject the casting solution to a double-screw extruder to be dissolved at 80° C. for 10 minutes, besides inject 20° C. pure water at a flow velocity of 20 ml/min for serving as spinning bore liquid, meanwhile squeeze the casting solution into a hollow spinneret after measuring by a metering pump, wherein an extension ratio of a spinning jet 2 times, then extrude the casting solution by the hollow spinneret, thus an air bath is passed through) having a height of 20 mm, and immersed in 20° C. pure water coagulation bath for shaping to obtain a primary PPTA porous hollow fiber membrane, then winding, washing and neutralizing by alkaline liquor, the PPTA porous hollow fiber membranes are obtained in water bath for over 48 hours at a room temperature, in such a manner that the PPTA porous hollow fiber membrane is obtained. After testing, the PPTA porous hollow fiber membrane has an external diameter of 2.0 mm, an internal diameter of 1.2 mm, a breaking strength of 1.5 MPa and an elongation at break of 18%. When the PPTA porous hollow fiber membrane is filtering under 0.1 MPa, a distilled water flux is 218.67 L/(m² h), a static contact angle is 36.3°, a breaking strength of 1.5 MPa and an elongation at break of 18%.

Comparation 1 under ultrasonic processing at 55° C., the PPTA resin is treated for 15-60 minutes in phosphoric acid solution which is a mass concentration of 0.5-1%, then the PPTA resin and the inorganic particles are dried in vacuum at 100° C.-200° C. for more than 24 hours;);

The wholly pretreated 2.0 wt % PPTA resin is mixed into 88 wt % sulfuric acid which is a mass concentration of 98% in a sealed stirring vessel, stirring for 2 hours at 40° C. to obtain transparent yellow thick premixed liquid, and then the 10 wt % composite pore-forming agents PEG (2000) is added to form casting solution, then inject the casting solution into a double-screw extruder to be dissolved under 80° C. for 10 minutes, besides inject at 20° C. pure water at a flow velocity of 20 ml/min for serving as spinning bore liquid, meanwhile squeeze the casting solution into a hollow spinneret after measuring by a metering pump, wherein an extension ratio of a spinning jet is 2 times, then extrude the casting solution by the hollow spinneret, thus an air bath having a height of 20 mm is passed through, and immersed in 20° C. pure water coagulation bath for shaping to obtain a primary PPTA porous hollow fiber membrane, then winding, washing and neutralizing by alkaline liquor, the PPTA porous hollow fiber membranes are obtained in water bath for over 48 hours at a room temperature, in such a manner that the PPTA porous hollow fiber membrane is obtained. After testing, the PPTA porous hollow fiber membrane has an external diameter of 2.0 mm, an internal diameter of 1.2 mm. When the PPTA porous hollow fiber membrane is filtering under 0.1 MPa, distilled water flux is 102.32 L/(m² h), a static contact angle is 72.8°, a breaking strength of 0.62 MPa and an elongation at break of 7%.

Example 2

Figure 2:
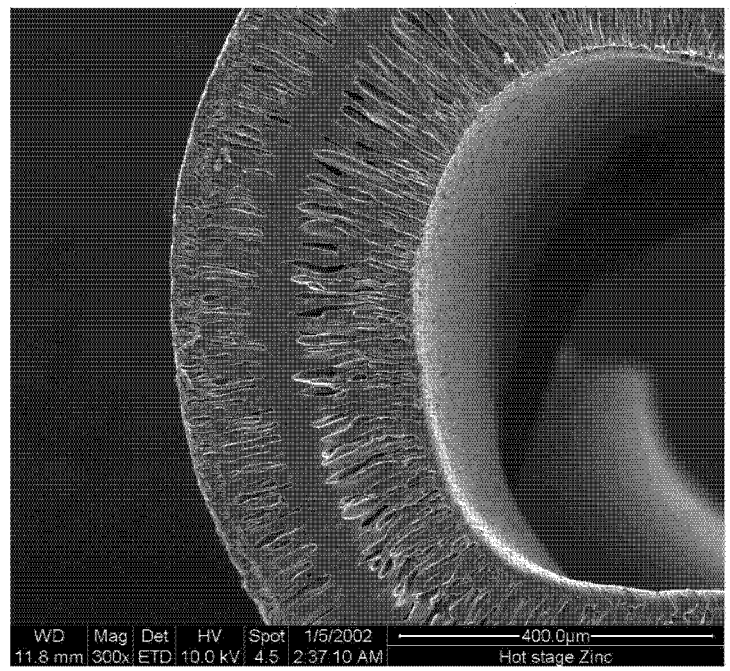
FIG. 2 is a partial enlarged view of an area shown in FIG. 1.

As mentioned in the example 1, the wholly pretreated 2.0 wt % PPTA resin and 0.5 wt % nano silicon dioxide are mixed into 88 wt % sulfuric acid which is a mass concentration of 100% in a sealed stirring vessel, stirring for 1 hours at 50° C. to obtain transparent yellow thick premixed liquid, and then the 10 wt % composite pore-forming agents PEG (2000) and PVP (30000) are added to form casting solution, wherein a mass ratio of PEG (2000):PVP (30000)=8:2, then inject the casting solution into a double-screw extruder to be dissolved at 85° C. for 8 minutes, besides inject 40° C. pure water at a flow velocity of 30 ml/min for serving as spinning bore liquid, meanwhile squeeze the casting solution into a hollow spinneret after measuring by a metering pump, wherein an extension ratio of a spinning jet is 2 times, then extrude the casting solution by the hollow spinneret, thus an air bath having a height of 20 mm is passed through, and immersed in 20° C. pure water coagulation bath for shaping to obtain a primary PPTA porous hollow fiber membrane, then winding, washing and neutralizing by alkaline liquor, the PPTA porous hollow fiber membranes are obtained in water bath for over 48 hours at a room temperature, in such a manner that the PPTA porous hollow fiber membrane is obtained (Shown as FIGS. 1 and 2). After testing, the PPTA porous hollow fiber membrane obtained has an external diameter of 2.0 mm, an internal diameter of 1.2 mm. When the PPTA porous hollow fiber membrane is filtering under 0.1 MPa, a distilled water flux is 318.34 L/(m² h), a static contact angle is 36.3°, a breaking strength of 2.25 MPa and an elongation at break of 53%.

Example 3

The extension ratio of a spinning jet is changed to be 3 times, the height of the air bath is 10 mm, and other conditions are identical to the example 2. After testing, the PPTA porous hollow fiber membrane obtained has an external diameter of 1.8 mm, an internal diameter of 1.2 mm. Under 0.1 MPa respectively testing permeation fluxes of 90° C. water and 90° C. N,N-dimethylacetamide (DMAc) of the PPTA porous hollow fiber membrane obtained, the testing permeation fluxes thereof are respectively 413.72 L/(m² h) and 265.36/(m² h). Under 90° C., a breaking strength of the PPTA porous hollow fiber membrane is 1.65 MPa and an elongation at break thereof is 28%.

Under 65° C. and 0.1 MPa, performing rejection test for 30 min on 1000 ml bovine serum albumin (BSA) having a mass concentration of 1 g/L, respectively testing absorbance of feed and permeate solutions by a double beam UV-vis spectrophotometer, and then calculating rejection rate. A filtration flux is 66.43 L/(m² h) and a rejection rate of protein is 92.54%.

Example 4

The 0.5 wt % silicon dioxide particles are changed to 0.5 wt % composite inorganic particles composed by $SiO_2$ and $CaCl_2$, wherein a mass ratio of $SiO_2:CaCl_2=1:1$. Other conditions are identical to the example 2. After testing, the PPTA porous hollow fiber membrane obtained has an external diameter of 2.0 mm and an internal diameter of 1.2 mm. When the PPTA porous hollow fiber membrane is filtering under 0.1 MPa, a distilled water flux is 120.47 L/(m² h).

Example 5

The 0.5 wt % silicon dioxide particles are changed to 0.5 wt % composite inorganic particles composed by $SiO_2$ and $CaCO_3$, wherein a mass ratio of $SiO_2:CaCO_3=1:1$. Other conditions are identical to the example 2. After testing, the PPTA porous hollow fiber membrane obtained has an external diameter of 2.0 mm and an internal diameter of 1.2 mm. When the PPTA porous hollow fiber membrane is filtering under 0.1 MPa, a distilled water flux is 80.72 L/(m² h).

What is claimed is:
1. A method for preparing an aromatic polyamide porous hollow fiber membrane, comprising adopting a casting solution and a filming technology;
   wherein components of the casting solution and mass fractions thereof are:
   PPTA resin 1%-20%;
   pore-forming agents 5%-20%;
   solvent 60%-94%; wherein a sum of the mass fractions of the PPTA, pore-forming agents and solvent is 100%;
   inorganic particles 0.05-50% of the weight of PPTA resin;
   wherein logarithmic specific concentration viscosity of the PPTA resin is at a range of 4.5 dL/g-9.5 dL/g;

the pore-forming agents are a water-soluble macromolecule and are selected from the group consisting of PEG with an average molecular weight of 1000-20000 and PVP with an average molecular weight of 10000-1000000;

the solvent is sulfuric acid having a mass concentration at a range of 98%-106%;

the inorganic particles are at least one member selected from the group consisting of silicon dioxide, calcium oxide and calcium carbonate;

wherein the method for preparing the aromatic polyamide porous hollow fiber membrane comprises steps of:

(1) pre-treating under 55° C. ultrasonic treatment, adding the PPTA resin in phosphoric acid solution having a mass concentration of 0.5-1% for 15-60 minutes, then drying the PPTA resin and the inorganic particles in vacuum under 100° C.-200° C. for more than 24 hours; and (2) preparing PPTA porous hollow fiber membrane mixing the PPTA resin, the inorganic particles and the solvent which are pretreated in a sealed stirring vessel, stirring for 1-2 hours under 40° C.-50° C. to obtain transparent yellow thick liquid, then adding the composite pore-forming agents to form casting solution, then injecting the casting solution into a double-screw extruder to be dissolved at 80-90° C. for 1-20 minutes, besides injecting sulfuric acid aqueous solution with a temperature at a range of 0-90° C., a flow velocity at a range of 10-100 ml/min and a volume fraction of 0-50% for serving as spinning bore liquid, while squeeze the casting solution into a hollow spinneret by a metering pump, wherein an extension ratio of a spinning jet is at a range of 1-10 times, finally extruding the casting solution by the hollow spinneret, thus an air bath is passed through a height range of 10-100 mm, and immersed in sulfuric acid aqueous solution having a volume fraction at a range of 0-50% for serving as coagulation bath to obtain a primary PPTA porous hollow fiber membrane, then winding, water scrubbing and neutralizing with alkaline liquor, extraction eluting in a room temperature water bath for over 48 hours to obtain the PPTA porous hollow fiber membrane.

2. An aromatic polyamide porous hollow fiber membrane is prepared according to the method for preparing an aromatic polyamide porous hollow fiber membrane, as recited in claim 1.

* * * * *